US010657235B2

United States Patent
Yang et al.

(10) Patent No.: US 10,657,235 B2
(45) Date of Patent: May 19, 2020

(54) DISPLAY DEVICE, MOBILE DEVICE AND DISPLAY METHOD

(71) Applicant: BOE TECHNOLOGY GROUP CO., LTD., Beijing (CN)

(72) Inventors: Guilong Yang, Beijing (CN); Miao Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/111,164

(22) PCT Filed: Jan. 13, 2016

(86) PCT No.: PCT/CN2016/070800
§ 371 (c)(1),
(2) Date: Jul. 12, 2016

(87) PCT Pub. No.: WO2017/024766
PCT Pub. Date: Feb. 16, 2017

(65) Prior Publication Data
US 2017/0228528 A1  Aug. 10, 2017

(30) Foreign Application Priority Data

Aug. 10, 2015 (CN) .......................... 2015 1 0485120

(51) Int. Cl.
*G06F 7/04* (2006.01)
*G06F 21/32* (2013.01)
(Continued)

(52) U.S. Cl.
CPC .............. *G06F 21/32* (2013.01); *G06F 21/31* (2013.01); *G06F 21/35* (2013.01); *G06F 21/84* (2013.01);
(Continued)

(58) Field of Classification Search
CPC ........ G06F 21/31; G06F 1/3218; G06F 3/147; G06F 2212/402; H04L 12/40104
(Continued)

(56) References Cited

U.S. PATENT DOCUMENTS 9,111,082 B2 *  8/2015  Gangi .................... G06F 21/34
10,008,164 B2 *  6/2018  Du ........................ G02F 1/1323
(Continued)

FOREIGN PATENT DOCUMENTS

CN  101013944 A  8/2007
CN  101236581    8/2008
(Continued)

OTHER PUBLICATIONS

Oprea et al, Securing a Remote Terminal Application with a Mobile Trusted Device, Dec. 10, 2004, IEEE, pp. 1-10.*
(Continued)

*Primary Examiner* — Alexander Lagor
*Assistant Examiner* — Jenise Jackson
(74) *Attorney, Agent, or Firm* — Womble Bond Dickinson (US) LLP

(57) ABSTRACT

The present disclosure discloses a display device comprising a display control module and a display module connected to the display control module, wherein the display control module comprises a display drive component and a security component connected to each other. The security component is configured to enable the display device to enter a secure and trusty display mode, and encrypt and decrypt displayed information in the secure and trusty display mode. A mobile device comprising the display device and a method for display using the mobile device are disclosed.

2 Claims, 3 Drawing Sheets

(51) Int. Cl.
- *G06F 21/84* (2013.01)
- *G06F 21/31* (2013.01)
- *G06F 21/35* (2013.01)
- *G06Q 20/32* (2012.01)
- *H04B 5/00* (2006.01)

(52) U.S. Cl.
CPC ....... *G06Q 20/3278* (2013.01); *H04B 5/0012* (2013.01)

(58) Field of Classification Search
USPC .......................................................... 726/28
See application file for complete search history.

(56) References Cited

U.S. PATENT DOCUMENTS

| | | | |
|---|---|---|---|
| 2004/0193910 A1 | 9/2004 | Moles | |
| 2005/0091338 A1* | 4/2005 | de la Huerga | A61J 1/1437 709/217 |
| 2006/0126156 A1* | 6/2006 | Evans | G02F 1/1323 359/320 |
| 2010/0120470 A1* | 5/2010 | Kim | G06F 1/1615 455/566 |
| 2012/0098793 A1* | 4/2012 | Cheng | G06F 3/0416 345/175 |
| 2012/0287003 A1* | 11/2012 | Kao | H01Q 1/243 343/702 |
| 2013/0117682 A1* | 5/2013 | Fukasawa | G06F 3/1205 715/740 |
| 2013/0229362 A1* | 9/2013 | Liu | G06F 3/041 345/173 |
| 2014/0013406 A1 | 1/2014 | Tremlet | |
| 2014/0096222 A1* | 4/2014 | Colnot | G06F 21/31 726/9 |
| 2014/0143150 A1* | 5/2014 | Karlov | G04G 99/006 705/44 |
| 2014/0195814 A1* | 7/2014 | Li | H04L 9/3226 713/183 |
| 2015/0062853 A1* | 3/2015 | Li | H01Q 1/44 361/782 |
| 2015/0123860 A1* | 5/2015 | Park | H01Q 1/526 343/720 |
| 2015/0143544 A1* | 5/2015 | Lu | H04L 63/10 726/29 |
| 2015/0254622 A1* | 9/2015 | Matsumoto | G06Q 20/4012 705/16 |
| 2015/0348047 A1* | 12/2015 | Landrok | G06Q 20/4016 705/44 |
| 2016/0036801 A1* | 2/2016 | Caldwell | H04L 63/08 726/6 |
| 2016/0241530 A1* | 8/2016 | Andreev | H04L 51/12 |
| 2016/0275514 A1* | 9/2016 | Kumar | G06Q 20/407 |
| 2016/0294785 A1* | 10/2016 | Lim | G06F 21/6209 |
| 2016/0365620 A1 | 12/2016 | Que et al. | |
| 2017/0098104 A1* | 4/2017 | Matsumoto | G06F 21/74 |

FOREIGN PATENT DOCUMENTS

| | | |
|---|---|---|
| CN | 101374042 A | 2/2009 |
| CN | 101707652 | 5/2010 |
| CN | 202120349 | 1/2012 |
| CN | 102916948 A | 2/2013 |
| CN | 103294247 | 9/2013 |
| CN | 103501191 A | 1/2014 |
| CN | 103544599 A | 1/2014 |
| CN | 103605937 A | 2/2014 |
| CN | 103856326 | 6/2014 |
| CN | 104485983 A | 4/2015 |
| CN | 104584025 A | 4/2015 |
| CN | 105162969 A | 12/2015 |
| JP | 2010102531 | 5/2010 |

OTHER PUBLICATIONS

Gilmore et al, Secure Remote Access to an Internet Web Server, IEEE, Dec. 1999, pp. 31-37.*
International Search Report and Written Opinion of the ISA in PCT/CN2016/070800, with English translation. 16 pages.
Office Action in Chinese Application No. 201510485120.X dated Sep. 19, 2017, with English translation.
"Second office action," CN Application No. 201510485120.X (Apr. 8, 2018).
"Decision on Rejection," CN Application No. 201510485120X dated Jun. 12, 2019.

* cited by examiner

DISPLAY DEVICE, MOBILE DEVICE AND DISPLAY METHOD

RELATED APPLICATIONS

The present application is the U.S. national phase entry of PCT/CN2016/070800, with an international filing date of Jan. 13, 2016, which claims the benefit of Chinese Patent Application No. 201510485120.X, filed on Aug. 10, 2015, the entire disclosures of which are incorporated herein by reference.

FIELD

The present disclosure relates to the field of display and information security, and more specifically to a display device, a mobile device comprising the display device and a method for display using the mobile device.

BACKGROUND

With fast development of mobile technologies, mobile devices are gradually playing a more and more important role. However, new mobile technologies and products with wireless function also provide chances for new attack types while being widely used, i.e. network crimes are causing a threat against security to people by means of the mobile device.

At present, the mobile device companies are all involved in difficulty in solving the mobile and wireless security problem. Researches indicate that more than two-thirds of the companies would undergo security problems resulting from improper connection of the mobile user to insecure services or downloading of malignant applications.

In the course of using the mobile device (e.g. mobile phone), a critical issue is to ensure the security of the user's information, while a user participable trusty display and input environment is to be realized. Intelligent mobile devices have become a multifunctional computing platform as the operating system of the mobile device has been intelligentized and complicated. However, since a large number of virus and Trojan Horse programs can invade the user's mobile device in various manners, people's trust in the mobile device constantly decreases. The traditional solution is to integrate a security component in the mobile device. However, the trusty business message outputted after being processed by the security component would further go into an untrusty processing environment during the display process and may hence be tampered by malignant applications such that the information finally seen by the user on the display screen is inconsistent with the business message.

Near-field communication (NFC) is a short range wireless communication technology. The so-called near-field communication (NFC) technology is a short range high-frequency wireless communication technology with an available range of about 10 cm, which can realize electronic identity identification or data transmission, for example, the functions such as credit card and access card. By means of this technology, the user can use a mobile phone in place of non-contact intelligent cards such as bus card, bank card, staff card, access card, membership card, and so on, and can further easily read the RFID label information attached to the billboard. An important application of the near-field communication is the payment function. User only needs to make the mobile device with NFC antennas get close to a transaction terminal such as a POS machine to accomplish the payment.

As the Chinese financial IC cards are gradually popularized, the flash payment based on the financial IC cards has also been widely used. The fast payment of the flash payment also starts to transfer to the mobile device, e.g. thereby forming an NFC payment mobile phone. The NFC payment mobile phone may be implemented by many solutions. However, since the NFC payment mobile phone needs large-area NFC antennas, integration of the NFC antennas in the circuit system inside the mobile phone would be affected by the circuit board, the battery, the metal housing, etc, thus the NFC communication effects are all undesirable.

SUMMARY

It is an objective of the present disclosure to provide a display device, a mobile device comprising the display device, and a method for display using the mobile device, which can at least partly alleviate or eliminate one or more of the abovementioned problems in the prior art.

In accordance with a first aspect of the present disclosure, a display device is provided, which may comprise a display control module and a display module connected to the display control module. The display control module may comprise a display drive component and a security component connected to each other, wherein the security component may be configured to enable the display device to enter a secure and trusty display mode, and encrypt and decrypt displayed information in the secure and trusty display mode.

The present disclosure provides a simple and convenient implementing manner so as to improve the security of the mobile device such as intelligent mobile phone, intelligent watch and intelligent television which needs a display device. By integrating a security component in the display control module, when the user interacts with the display device, the display device can perform encryption and decryption of data directly to reduce the transmission stages of the business message in a plaintext state, and further prevent the trusty business information from being intercepted and tampered by a third party, improving the trustiness of the mobile device.

In operation, the security component provides the user with a specific secure and trusty environment, i.e. secure and trusty display mode. In this mode, the security component performs authentication and security examination of a business message from the service system of the mobile device background. When the authentication of the business message is unsuccessful or the security component determines that the business message is insecure, the display drive component rejects displaying subsequent procedures of the business message, thereby eliminating the risk of providing insecure information to the user. When the authentication of the business message is successful or the security component determines that the business message is secure, the security component decrypts the business message, and the display drive component controls the display module to display the decrypted business message to the user. In this way, the user, when in the secure and trusty display mode, is always presented with secure and trusty information, thus the user's confidence in the security of the mobile device can be boosted. The dedicated secure and trusty display mode facilitates improvement to the user's experience of the trusty business, and increase in the user's will of using a business such as mobile payment at a high information security level.

In accordance with an embodiment of the present disclosure, the display device may further comprise a touch module connected to the display control module, and the display control module further comprises a touch identification component connected to the display drive component and the security component. That is to say, the display device may be a display device with touch function. In this case, when the application in the host module of the mobile device requires the display device to enter a secure and trusty display mode, the display drive component may request the user to input a password or human body identification information (e.g. inputting a fingerprint) via the touch module. The security component authenticates the received user password. When the authentication is successful, the display drive component enables the display device to enter a secure and trusty display mode; otherwise, the display drive component rejects entering the trusty display mode, which can consequently cause decrease in the risk that the display device is misused or embezzled by other persons than the approved user.

In accordance with another embodiment of the present disclosure, the display module may further comprise near-field communication (NFC) antennas integrated therein.

The integration of NFC antennas in the display module can not only prevent impact of the devices such as display screen on the communication effect of the NFC antennas caused by combination and design of the NFC antennas only at the time of designing the complete machine, but also facilitate simplification of the design of the complete machine of the NFC payment product, thereby improving the NFC communication effect and the transaction success rate of the mobile payment.

In accordance with a further embodiment of the present disclosure, when the display device has touch control functionality, the near-field communication (NFC) antennas may be integrated in the touch module.

Likewise, the integration of the NFC antennas in the display module can not only prevent impact of the devices such as display screen on the communication effect of the NFC antennas caused by combination and design of the NFC antennas only at the time of designing the complete machine, but also facilitate simplification of the design of the complete machine of the NFC payment product, thereby improving the NFC communication effect and the transaction success rate of the mobile payment.

In accordance with embodiments of the present disclosure, the display device may further comprise a trusty mode indicator light configured to indicate that the display device is in a secure and trusty display mode so as to hint to the user that the display device is in a secure and trusty display mode. In practical applications, displays of the display device in the secure and trusty display mode and the general display mode may be indistinguishable for the user, thus the trusty mode indicator light can help the user confirm that the display device is in a secure and trusty display mode. Thus, the displayed information is secure and trusty information. Specifically, when the display device is in a secure and trusty display mode, the trusty mode indicator light may emit light or flicker; otherwise, the trusty mode indicator light is extinguished. Alternatively, when the display device is in a secure and trusty display mode, the trusty mode indicator light may have a first color (e.g. green color); otherwise, the trusty mode indicator light has a second color (i.e. red color) so as to provide the user with a hint about the display mode in which the display device is.

The trusty mode indicator light may be located at any position of the display device, but it is preferably located on the same side as the display screen of the display device to facilitate the user to see the hint of the trusty mode indicator light at any moment. The trusty mode indicator light is also advantageous to improvement of the user's experience of the trusty business and increase in the user's will of using a business such as mobile payment at a high information security level.

The display device described above may be a liquid crystal display (LCD). The liquid crystal display has advantages including low power consumption, small radiation, no distortion, large viewable area, fine picture quality, lightness and thinness, and so on, and is hence widely used in various display devices. The addition of a security component to the display control module of the liquid crystal display can improve the security of the liquid crystal display and extend the application range thereof.

In accordance with a second aspect of the present disclosure, a mobile device is provided, which comprises any display device described above and a trusty service system in communication with the display device. The trusty service system is equivalent to a business background of the mobile device, which is in communication with the display device so as to display the trusty business message on the display device or receive from the display device and process the trusty business message.

In accordance with embodiments, the above mobile device may comprise near-field communication antennas arranged in the display device, wherein the mobile device may be configured to communicate with an external transaction platform via the near-field communication antennas.

The above mobile device has the same advantages as the display device described in the first aspect of the present disclosure, and will not be repeatedly described here.

In accordance with a third aspect of the present disclosure, a display method is provided. The method employs the mobile device according to the second aspect of the present disclosure and comprises the steps of:

authenticating the password inputted by the user via the security component;

if the authentication is successful, the display device entering a secure and trusty display mode;

in the secure and trusty display mode, the host module receiving from the trusty service system a business message and forwarding it to the display control module;

the security component of the display control module authenticating the received business message; if the authentication is successful, decrypting the business message; and the display drive component controlling the display module to display the decrypted business message. The trusty service system is equivalent to a business background of the mobile device, which is in communication with the display device so as to display the trusty business message on the display device or receive from the display device and process the trusty business message.

The above method enables authentication of the user by the display device and display of the trusty business message from the trusty service system to the user. On one hand, when the application in the host module of the mobile device requires the display device to enter a secure and trusty display mode, the display drive component can request the user to input a password. The security component authenticates the received user's password. When the authentication is successful, the display drive component enables the display device to enter the secure and trusty mode; otherwise, the display drive component rejects entering the trusty display mode. Consequently, the risk that the display device is misused or embezzled by other persons than the approved user can be decreased. On the other hand, the security component provides the user with a specific secure and trusty environment, i.e. secure and trusty display mode. In this mode, the security component performs authentication and security examination of the business message from the service system of the mobile device background. When the authentication of the business message is unsuccessful or the security component determines that the business message is insecure, the display drive component rejects displaying subsequent procedures of the business message, thereby eliminating the risk of providing insecure information to the user. When the authentication of the business message is successful or the security component determines that the business message is secure, the security component decrypts the business message, and the display drive component controls the display module to display the decrypted business message to the user. In this way, the user, when in the secure and trusty display mode, is always presented with secure information. Thus, the user's confidence in the security of the mobile device is boosted.

In accordance with an embodiment of the present disclosure, the above method may further comprise the steps of:

the display drive component receiving a user input and forwarding the user input to the security component;

the security component encrypting the received user input to generate a trusty business message; and forwarding an encrypted trusty business message to the trusty service system via the display drive component and the host module for processing.

By virtue of the above steps, the display device can transmit the encrypted trusty information inputted by the user to the trusty service system for processing therein.

BRIEF DESCRIPTION OF DRAWINGS

These and other aspects of the present disclosure will be described in more detail with reference to the drawings that illustrate the embodiments of the present disclosure. In the drawings.

DETAILED DESCRIPTION

The present disclosure will be described below more comprehensively with reference to the drawings in which the currently preferred embodiments of the present disclosure are illustrated. However, the present disclosure may be embodied by many different forms and should not be construed as being limited to the embodiments stated herein. For integrity and thoroughness, these embodiments are provided for conveying the scope of the present disclosure to those skilled in the art comprehensively.

Figure 1:
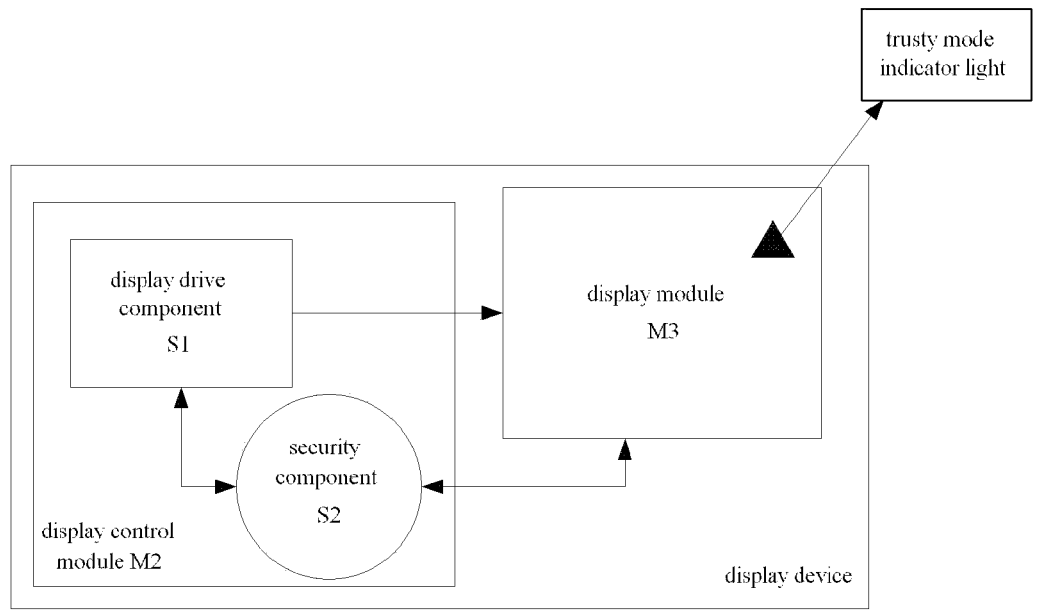
FIG. 1 illustrates a schematic block diagram of a display device according to embodiments of the present disclosure.

As shown in FIG. 1, the display device comprises a display control module M2 and a display module M3 connected to the display control module. The display control module M2 may comprise a display drive component S1 and a security component S2 connected to each other, wherein the security component S2 is configured to enable the display device to enter a secure and trusty display mode and encrypt and decrypt displayed information in the secure and trusty display mode. In this structure, the security component S2 is directly connected to the display drive component S1. The display module M3 can display the content decrypted by the security component S2 only when the display drive module sets the display module M3 in a secure and trusty display mode, thereby ensuring that the content seen by the user is information authenticated by the security component S2.

In operation, the security component S2 provides the user with a specific secure and trusty environment, i.e. secure and trusty display mode. In this mode, the security component receives a business message from the service system of the mobile device background which is forwarded by the display drive component S1, and performs authentication and security examination of the business message. When the security authentication of the business message performed by the security component is unsuccessful or the security component determines that the business message is untrusty, the security component rejects performing decryption and outputting a corresponding trusty business message. The display drive component does not receive a trusty business message, and consequently terminates the display or displays risk prompting information according to the indication of the security component and returns the corresponding processing result to the background service system. When the authentication of the business message by the security component is successful, the security component decrypts the business message and returns the decrypted trusty business message to the display drive component. The display drive component converts the trusty business message into display information and displays the decrypted trusty business message to the user by controlling the display module.

Figure 2:
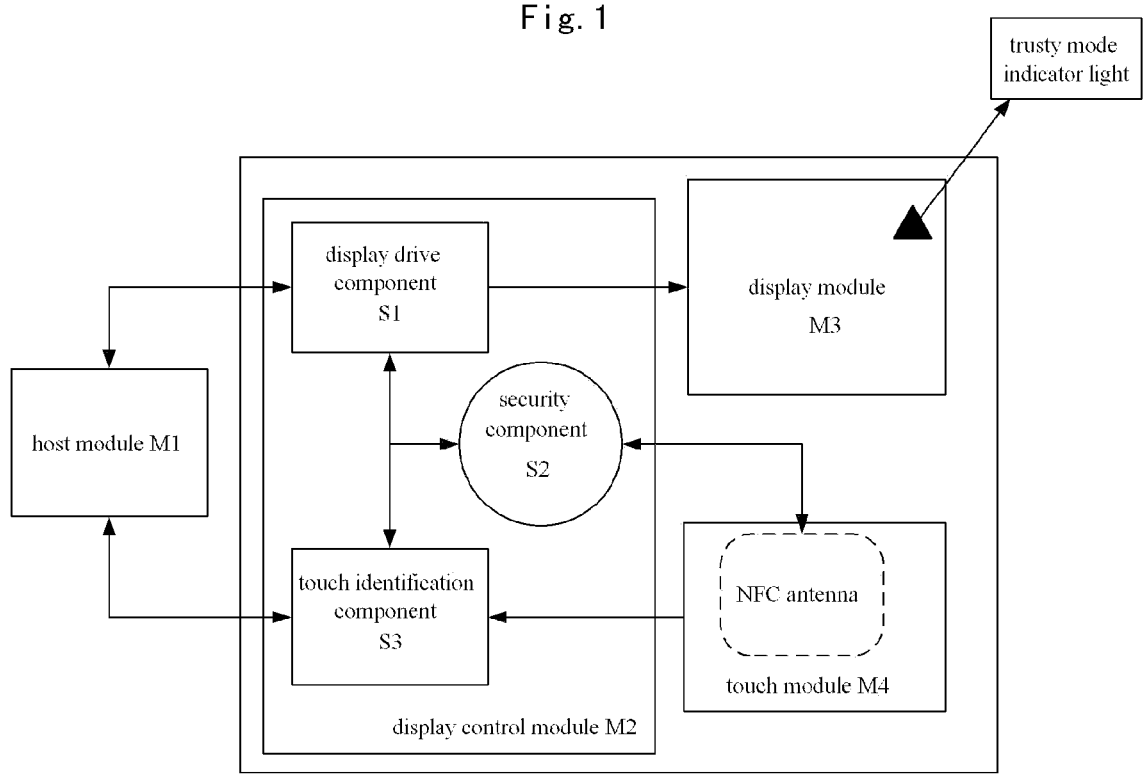
FIG. 2 illustrates a schematic block diagram of a display device according to embodiments of the present disclosure.

As shown in FIG. 2, the mobile device comprises a host module M1 and a display device. As compared to the display device shown in FIG. 1, the display device shown in FIG. 2 further comprises a touch module M4 connected to the display control module M2, and the display control module M2 further comprises a touch identification component S3 connected to the display drive component S1 and the security component S2. That is to say, the display device is a display device with touch function. In this case, when the application in the host module of the mobile device requires the display device to enter a secure and trusty display mode, the display drive component M2 may request the user to input information via the touch module. The information may be a user password for the security component S2 to authenticate the identity of the device possessor, and may also be user sensitive information (e.g. bank account, transaction amount, etc) returned as requested by the business message. When the display device switches from the general display state to the secure and trusty display mode, in accordance with a preset security policy, the user is required to submit the user password to the security component. The security component checks the legality of the user password to determine that the one who uses the current device is a legal possessor. When the authentication of the user password is successful, the security component notifies the display drive component and the display device to enter the secure and trusty display mode. In this mode, the display drive component no longer receives and processes general display instruction requests that may contain false, deceptive information which is sent by the host module M1. If the authentication of the user password is unsuccessful, the display drive component rejects entering into the secure and trusty display mode but still receives the general display instruction requests of the host module. Consequently, the risk that the display device is misused or embezzled by other persons than the approved user can be decreased.

Figure 3:
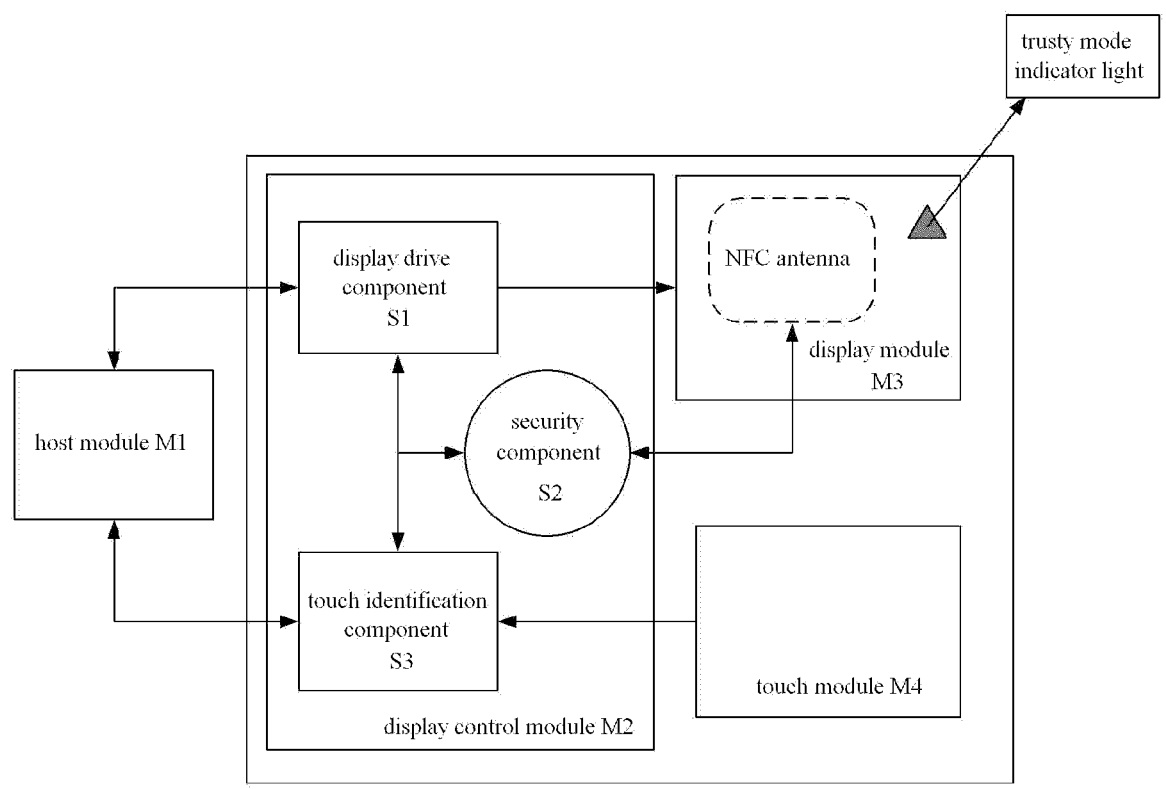
FIG. 3 illustrates a schematic block diagram of a display device according to embodiments of the present disclosure.

In addition, the display device may optionally comprise near-field communication (NFC) antennas integrated therein. Specifically, the NFC antennas may be integrated in the display module M3, as shown in FIGS. 1 and 3. Alternatively, the NFC antennas may be integrated in the touch module M4, as shown in FIG. 2.

The integration of the NFC antennas in the display device can not only prevent impact of the devices such as display screen on the communication effect of the NFC antennas caused by combination and design of the NFC antennas only at the time of designing the complete machine, but also facilitate simplification of the design of the complete machine of the NFC payment product, thereby improving the NFC communication effect and the transaction success rate of the mobile payment.

As shown in FIGS. 1-3, the display device may further optionally comprise a trusty mode indicator light configured to indicate that the display device is in a secure and trusty display mode so as to hint to the user that the display device is in a secure and trusty display mode. Specifically, when the display device is in a secure and trusty display mode, the trusty mode indicator light may emit light or flicker; otherwise, the trusty mode indicator light is extinguished. Alternatively, when the display device is in a secure and trusty display mode, the trusty mode indicator light may have a first color (e.g. green color); otherwise, the trusty mode indicator light has a second color (e.g. red color) so as to provide the user with a hint about the display mode in which the display device is.

It is to be noted that although the trusty mode indicator light is shown in the drawings as being located in the display mode M3, the trusty mode indicator light may be located at any position of the display device. In accordance with an example, the trusty mode indicator may be located at the same side with the display screen of the display device such that the user can see the hint of the trusty mode indicator light at any moment. The trusty mode indicator light is also advantageous to improvement of the user's experience of the trusty business and increase in the user's will of using a business such as mobile payment at a high information security level.

In embodiments of the present disclosure, a mobile device is provided, which comprises a host module and any display device described above, as well as a trusty service system in communication with the display device. The trusty service system is equivalent to a business background of the mobile device, which is in communication with the display device so as to display the trusty business message on the display device or receive from the display device and process the trusty business message.

In an example, the mobile device comprises near-field communication antennas arranged in the display device, wherein the mobile device is configured to communicate with an external transaction platform via the near-field communication antennas. The security component of the display control module enables the mobile device to download an electronic wallet in the secure and trusty display mode. The mobile device communicates with the external transaction platform via the near-field communication antennas and accomplishes the transaction with the external transaction platform using the electronic wallet.

By using the above mobile device in the transaction, the security of the transaction payment can be improved, the user's experience can be enhanced, and the user's confidence in use of a mobile payment can be boosted.

Figure 4:
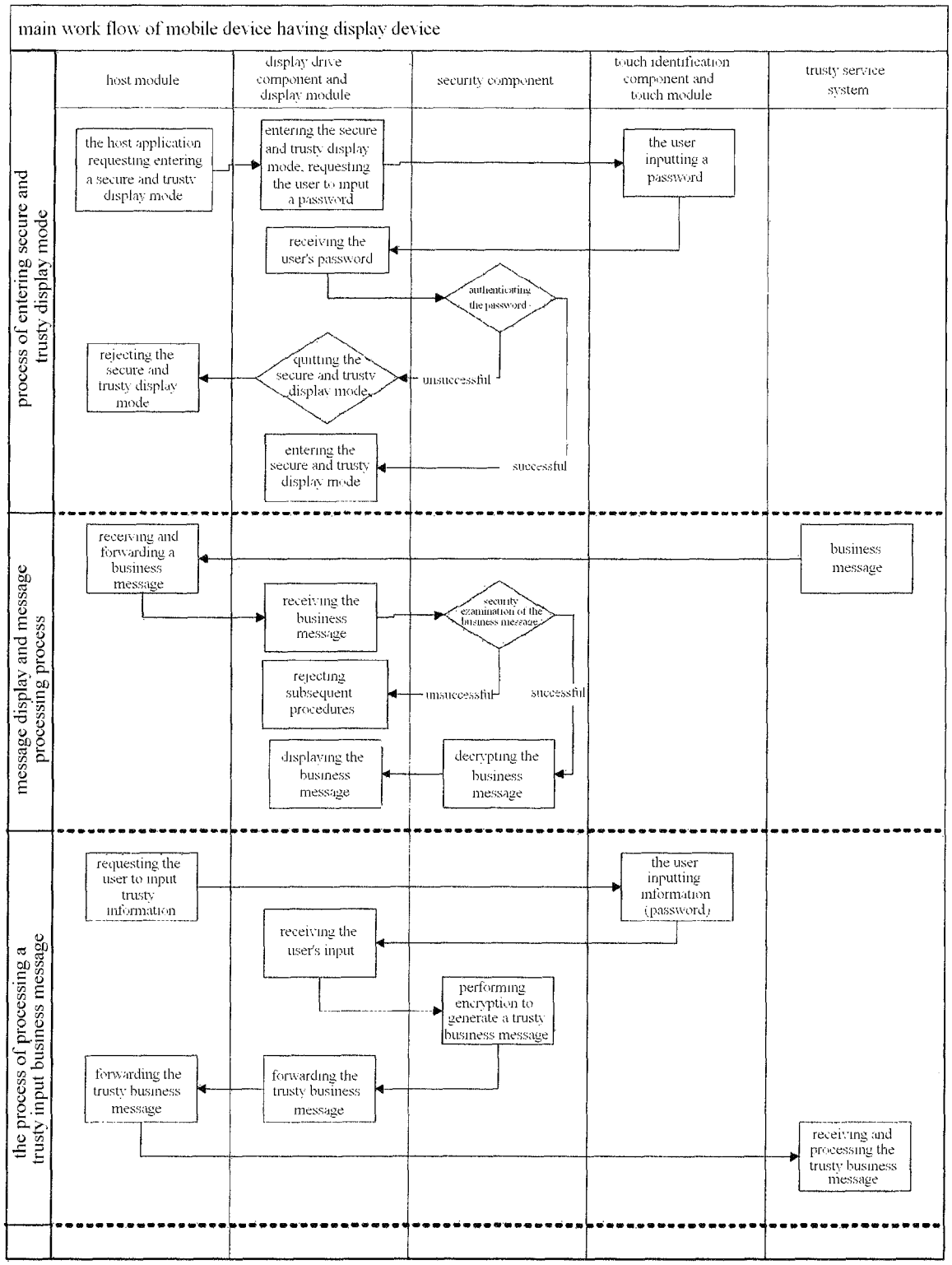
FIG. 4 illustrates a flow chart of a display method according to embodiments of the present disclosure.

FIG. 4 shows a flow chart of a secure and trusty display method according to embodiments of the present disclosure. As shown in FIG. 4, in the course of entering the secure and trusty mode, the host module of the mobile device receives from the host application a request for entering a secure and trusty display mode, enables the display drive component to enter the secure and trusty display mode and requests the user to input a password on the display module. When the user inputs a password via the touch module or other input modules of display device, the display drive component receives the user's password and passes the user's password to the security component for authentication. If the authentication is unsuccessful, the security component notifies the display drive component to quit the secure and trusty display mode, and the host module further rejects the secure and trusty display mode. If the authentication is successful, the security component notifies the display module to enter the secure and trusty display mode.

Thereafter, during the message display and message processing process, the trusty service system sends a business message to the host module. After receiving the business message, the host module forwards it to the display drive component and the display drive component forwards it to the security component. The security component performs security examination and authentication of the business message. When the authentication of the business message is unsuccessful, the security component notifies the display drive component to reject subsequent procedures. When the authentication of the business message is successful, the security component decrypts the business message and notifies the display drive component to display the decrypted business message.

The above method enables authentication of the user by the display device and display of the trusty business message from the trusty service system to the user. On one hand, when the application in the host module of the mobile device requires the display device to enter a secure and trusty display mode, the display drive component can request the user to input a password. The security component authenticates the received user's password. When the authentication is successful, the display drive component enables the display device to enter the secure and trusty mode; otherwise, the display drive component rejects entering the trusty display mode. Consequently, the risk that the display device is misused or embezzled by other persons than the approved user can be decreased. On the other hand, the security component provides the user with a specific secure and trusty environment, i.e. secure and trusty display mode. In this mode, the security component performs authentication and security examination of the business message from the service system of the mobile device background. When the authentication of the business message is unsuccessful or the security component determines that the business message is insecure, the display drive component rejects displaying subsequent procedures of the business message, thereby eliminating the risk of providing insecure information to the user. When the authentication of the business message is successful or the security component determines that the business message is secure, the security component decrypts the business message, and the display drive component controls the display module to display the decrypted business message to the user. In this way, the user, when in the secure and trusty display mode, is always presented with secure information, thus the user's confidence in the security of the mobile device can be boosted.

Alternatively, during the process of processing the trusty input business message, the host module requests the user to input trusty information. The user inputs information via the touch module or other input modules. The display module receives the user's input and forwards it to the security component. The security component encrypts the received user's input to produce a trusty business message. Finally, the encrypted trusty business message is forwarded to the trusty service system via the display drive component and the host module for processing.

When entering the secure and trusty display mode, a display drive chip takes over the outputs of the touch module or other input modules such that the user's input results are inputted to the security component for encryption and then returned to the host module so as to ensure that the sensitive information inputted by the user is already in an encrypted state and only the approved business background can perform decryption to obtain the information inputted by the user.

Those skilled in the art recognize that the present disclosure is by no means limited to the illustrative embodiments described above. On the contrary, many amendments and modifications are possible within the scope of the enclosed claims. For example, the trusty mode indicator light may be a dedicated display area on the display screen, and may also be a display LED lamp independently mounted.

The present disclosure may be widely applied to various mobile devices, including intelligent mobile phone, tablet computer, intelligent watch, other mobile devices with display device, and so on.

Furthermore, those skilled in the art, when practicing the claimed disclosure, can understand and implement the modifications of the disclosed embodiments by studying the drawings, the text and the enclosed claims. In the claims, the word "comprising" does not exclude other elements or steps. The mere fact that certain measures are recited in mutually different dependent claims does not indicate that a combination of these measures cannot be used to advantage.

The invention claimed is:

1. A method using a mobile device comprising a host module and a display device, the method comprising
  connecting a display module of the display device to a display control module of the display device;
  connecting a touch module to the display control module;
  directly connecting a display drive component of the display control module and a security component of the display control module;
  connecting a touch identification component of the display control module to the display drive component and the security component;
  integrating a near-field communication antennas independent from the display control module and the touch module into the display module;
  displaying, by the display module, information under the control of the display control module;
  indicating, by a trusted mode indicator light, that the display device is in a secure and trusted display mode;
  enabling, by the security component, the display device to enter the secure and trusted display mode;
  encrypting and decrypting, by the security component, displayed information in the secure and trusted display mode,
  in response to the display device entering the secure and trusted display mode, rendering the trusted mode indicator light to emit light with a first color;
  in response to the display device exiting the secure and trusted display mode, rendering the trusted mode indicator light to emit light with a second color different from the first color,
  authenticating, via the security component, a password inputted by a user;
  in response to the authentication being successful, rendering the display device to enter the secure and trusted display mode;
  in the secure and trusted display mode, receiving, by the host module, a business message from a trusted service system and forwarding it to the display control module;
  authenticating, by the security component of the display control module, a received business message;
  in response to the authentication being successful, decrypting the business message; and
  controlling, the display drive component, the display module to display a decrypted business message.

2. The method according to claim 1, further comprising:
  receiving, by the display drive component, a user input and forwarding the user input to the security component;
  encrypting, by the security component, a received user input to generate a trusted business message; and
  forwarding an encrypted trusted business message to the trusted service system via the display drive component and the host module for processing.

* * * * *